US006361576B1

(12) United States Patent
Andriola

(10) Patent No.: US 6,361,576 B1
(45) Date of Patent: Mar. 26, 2002

(54) HIGH TEMPERATURE CYCLONE OUTLET TUBE

(75) Inventor: Anthony Vincent Andriola, Louisville, KY (US)

(73) Assignee: Fisher-Klosterman, Inc., Louisville, KY (US)

( * ) Notice: Subject to any disclaimer, the term of this patent is extended or adjusted under 35 U.S.C. 154(b) by 0 days.

(21) Appl. No.: 09/548,078

(22) Filed: Apr. 12, 2000

(51) Int. Cl.⁷ .............................................. B01D 45/12
(52) U.S. Cl. ..................................... 55/459.1
(58) Field of Search ................. 55/459.1, 435

(56) References Cited

U.S. PATENT DOCUMENTS 3,273,320 A * 9/1966 Delaune et al. ............ 55/459.1
3,327,456 A * 6/1967 Guber et al. ................ 55/459.1

FOREIGN PATENT DOCUMENTS

DE    447802 A2 * 9/1991 ................ 55/459.1

* cited by examiner

Primary Examiner—Robert A. Hopkins
(74) Attorney, Agent, or Firm—Camoriano and Associates; Theresa Fritz Camoriano

(57) ABSTRACT

A cyclone for high temperature applications where the outlet pipe is vertically hung, properly located, and sealed over the vessel outlet opening without the need for bolts, so as to allow dimensional growth due to thermal expansion without failure-causing stresses induced on welds.

18 Claims, 4 Drawing Sheets

HIGH TEMPERATURE CYCLONE OUTLET TUBE

BACKGROUND OF THE INVENTION

Cyclone separators are typically found in applications which require the removal of particulates from a fluid stream. This fluid stream may be a liquid such as water, or it may be a gas such as air. Cylones are very useful for pollution control applications, removing particulate matter from exhaust gases before these gases are directed to baghouses or scrubbers or are discharged directly to the atmosphere.

Many exhaust gas applications operate at high temperatures such that the cyclone itself is exposed to these high temperatures. Thus, the cyclone experiences dimensional growth due to thermal expansion. It is desirable to be able to operate at these high temperatures, sometimes in excess of 1,500° F., while maintaining a relatively cool skin temperature below 650° F. so that inexpensive materials of construction, such as carbon steel, may be used for the vessel body of the cyclone. In order to accomplish this, it is industry standard to utilize refractory material, such as Vibecast refractory, lining the inside of the cyclone vessel body.

While the use of the refractory allows the high temperature operation while maintaining a much cooler cyclone vessel body, it causes a problem when it comes to connecting the cyclone outlet pipe, operating at this higher temperature, to the much cooler cyclone vessel body. In the prior art, a bolted, flanged connection has been made between the outlet pipe and the cyclone vessel body, with a gasket to seal the gap between the two flange faces. This unyielding connection does not allow for relative movement between the outlet pipe and the cyclone vessel body. Since this relative motion must occur due to the differences in thermal expansion between the outlet pipe and the cyclone vessel body, the result is very high induced stresses on the welds as well as on the bolts, resulting in eventual failure, requiring down time and expense to repair and replace the damaged parts. The severe operating conditions also tend to cause the nuts to become frozen onto the bolts, making it very difficult to remove and replace a worn outlet pipe. These difficulties have generally limited operation of the cyclones to temperatures in the range of 1,600° F. to 1,800° F.

SUMMARY OF THE INVENTION

The present invention provides an arrangement for mounting the outlet pipe onto the vessel body of a cyclone operating at very high temperatures, without experiencing the failures and limitations present in the prior art. The present invention eliminates the use of flanges or bolts, substantially reduces the thermal-expansion-induced stresses on the welds, and allows operation at temperatures well in excess of 1800° F. In fact, this present invention will allow operation of the cyclone in a coke calciner application where the exhaust gases entering the cyclone are at temperatures in excess of 2,250° F.

The present invention provides for nesting of the outlet pipe into an opening in the vessel body so that the weight of the outlet pipe keeps the pipe in place and there is no need for bolts. The preferred frustro-conical shapes of the nesting surfaces properly center and locate the outlet pipe, and the contact surface area between the two parts is generally sufficient to seal the surfaces without the need for gaskets, although a gasket can be used if desired. This connection permits relative expansion and contraction of the vessel and the outlet pipe without affecting the connection or seal between the parts. It also results in a simpler, faster installation with no bolts, quick and automatic location of the outlet pipe in the outlet opening, and easy removal and replacement of the outlet pipe without the need to remove or install bolts.

DESCRIPTION OF THE PREFERRED EMBODIMENTS

Figure 1:
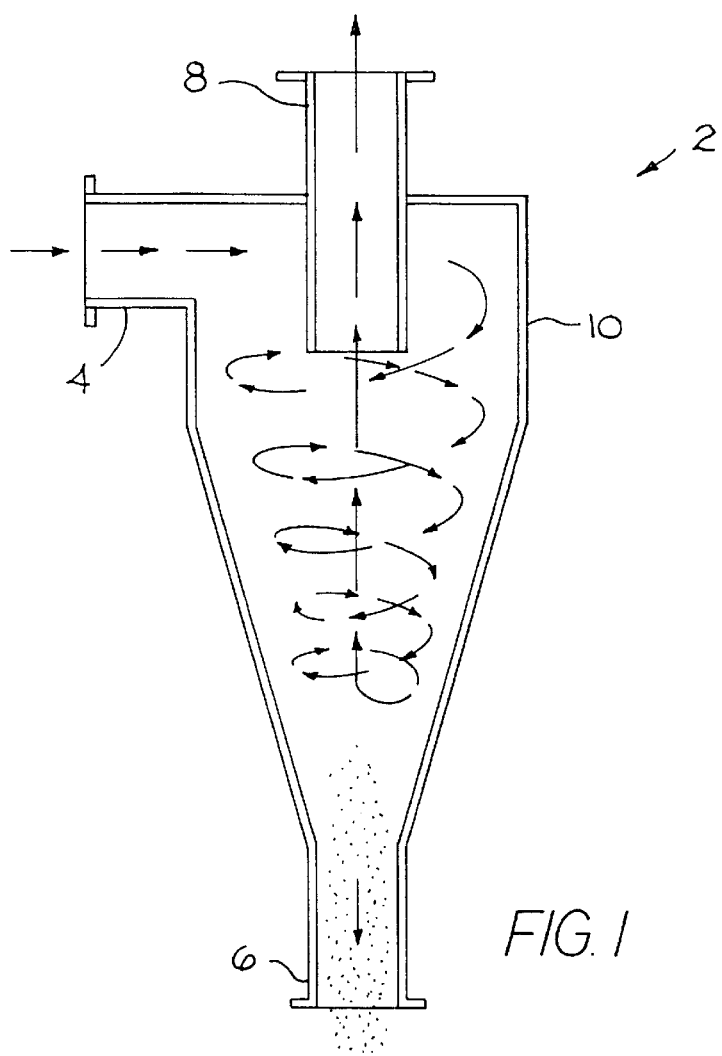
FIG. 1 is a schematic sectional view of a typical cyclone.

FIG. 1 is a schematic sectional view of a typical cyclone 2. The particulate laden fluid stream enters via the tangential inlet pipe 4 and swirls inside the vessel body 10 of the cyclone 2. The particulates are thrown against the wall of the cyclone 2 and fall to the bottom to be expelled via the particulates discharge pipe 6. The fluid stream eventually turns up to travel inside the swirling vortex and exits via the outlet pipe 8.

Figure 2:
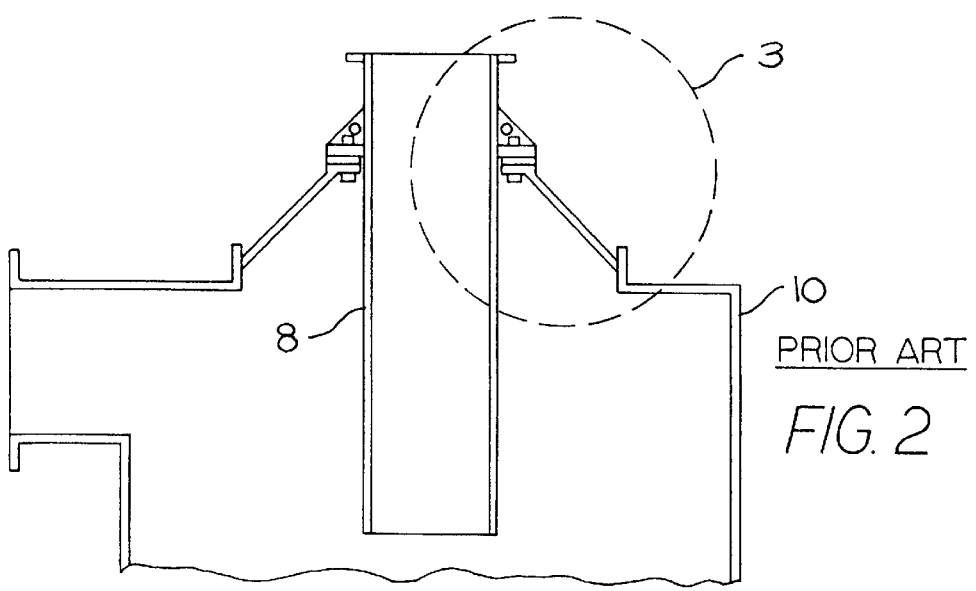
FIG. 2 is a enlarged, broken away, sectional view of the area securing the outlet pipe to the cyclone body in the prior art.
Figure 3:
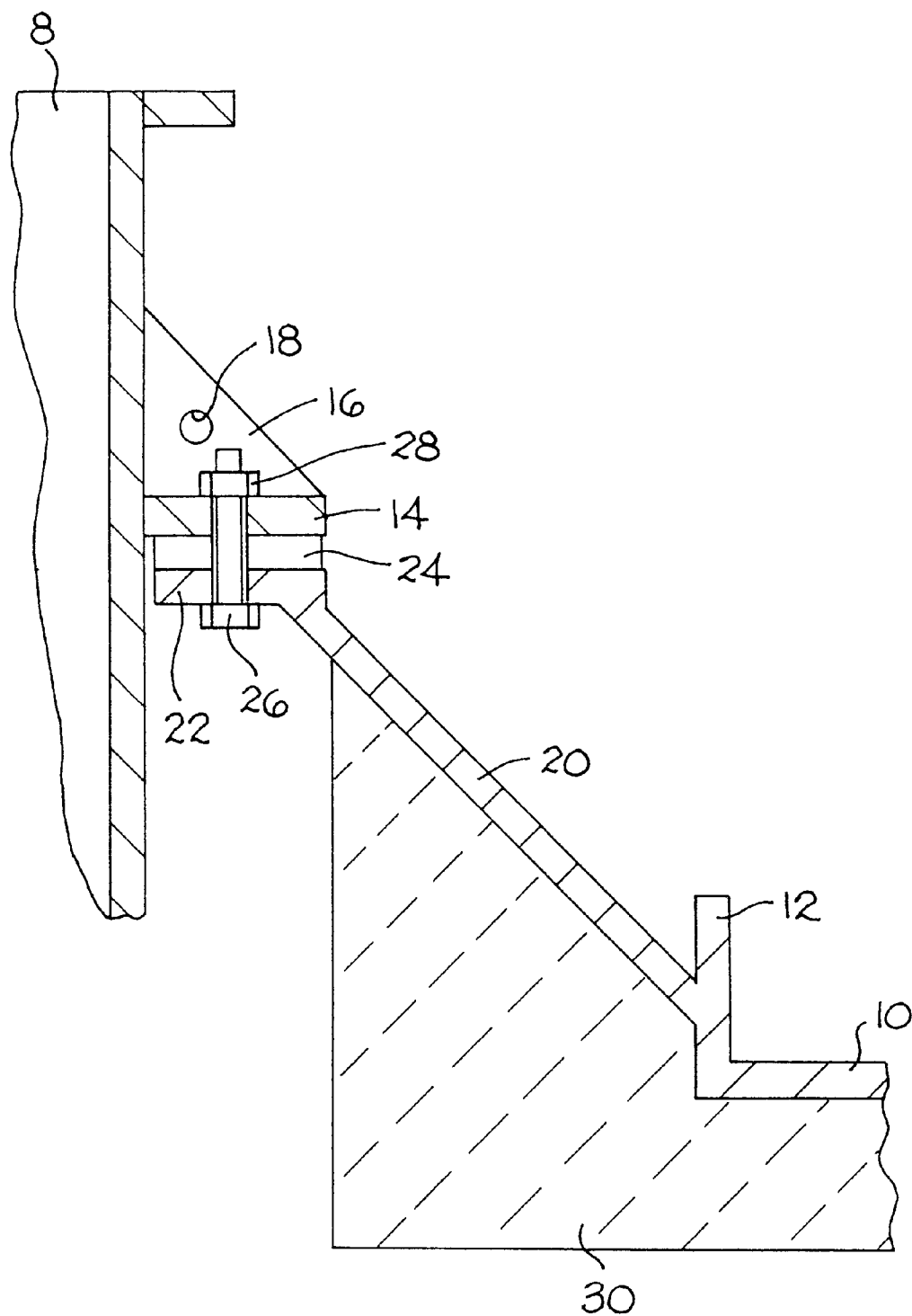
FIG. 3 is a detailed, enlarged view of the connection between the outlet pipe and vessel body of FIG. 2.

FIG. 2 shows the connection between the cyclone vessel body 10 and the outlet pipe 8 as taught in the prior art for high temperature applications. A more detailed and enlarged view of this connection is shown in FIG. 3. The outlet pipe 8 has a flange 14 welded to its outside surface. Gussets 16 reinforce the flange 16 to the outlet pipe 8, and lifting holes 18 are used to aid in the installation of the outlet pipe 8.

A projection 12 from the vessel body 10 may extend above and beyond the height of the outlet pipe 8, boxing in the outlet pipe 8 and serving as an exhaust manifold. However, for the purposes of the present invention, it does not matter what other connections or enclosures there may be at the outlet of the outlet pipe. The concern is how the outlet pipe is connected to the vessel body.

A collar 20 is welded at one end to the vessel body 10, and terminates at the other end with a flange 22, which mates to the flange 14 on the outlet pipe 8. A gasket 24 is inserted between the mating flanges 14, 24, and bolts 26 and nuts 28, arranged in a bolt-hole pattern, secure the outlet pipe 8 to the vessel body 10 of the cyclone 2. Insulation 30 lines the inside walls of the cyclone 2 to help keep the skin temperature of the vessel body 10 at a relatively cool 650° F. or below, while the exhaust gas temperatures reach between 1,600° F. and 1,800° F.

Differences in dimensional growth due to thermal expansion cause severe stresses to this design, particularly at the welds where the collar 20 is secured to the vessel body 10 and to the mating flange 22, as well as to the bolts and the weld securing the flange 14 to the outlet pipe 8.

Figure 4:
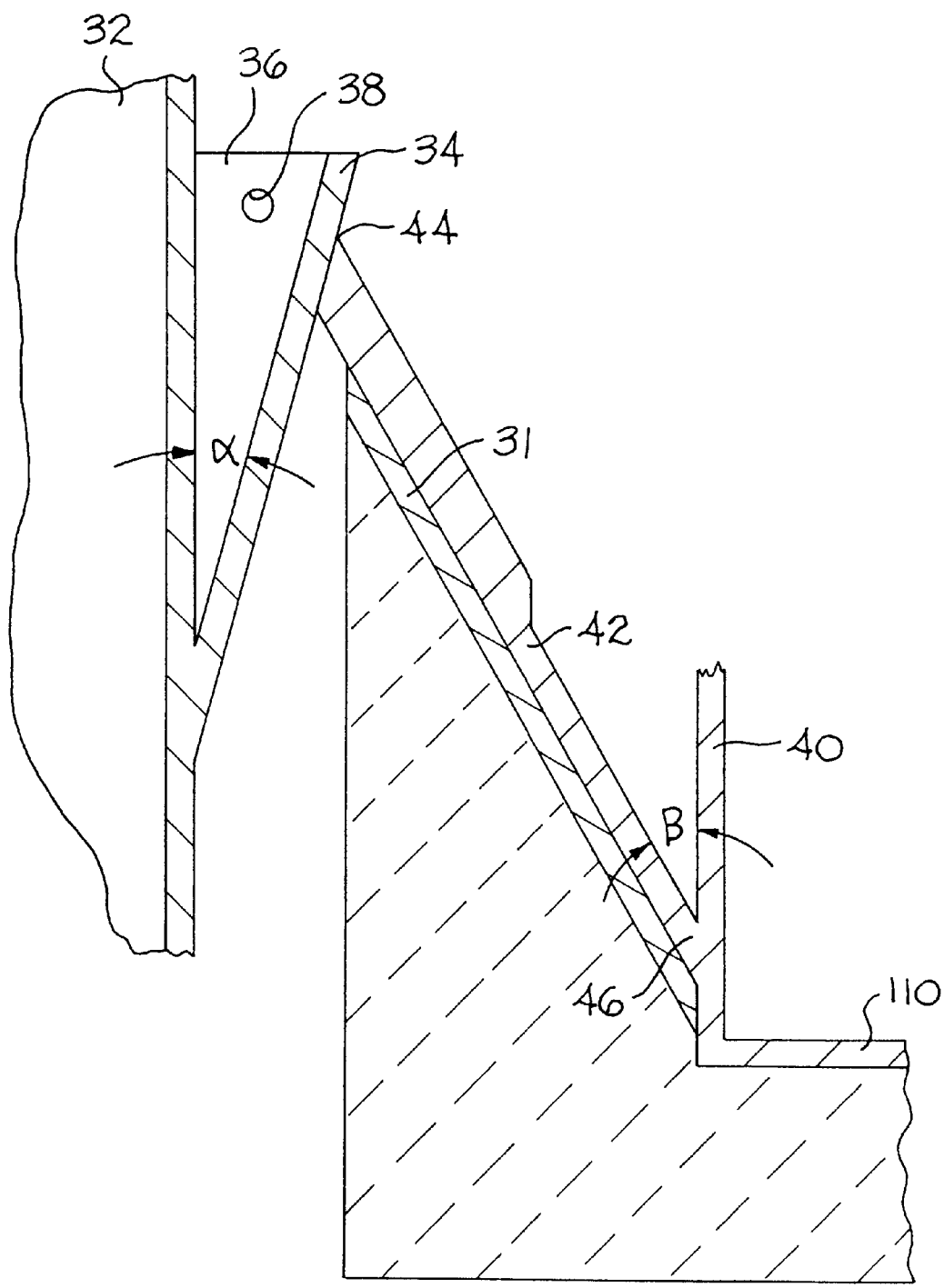
FIG. 4 is a detailed, enlarged view of a preferred embodiment of the connection between the outlet pipe and vessel body of the present invention; and, FIG. 5 is a perspective, exploded, partially broken away view of a cyclone made in accordance with the present invention.
Figure 5:
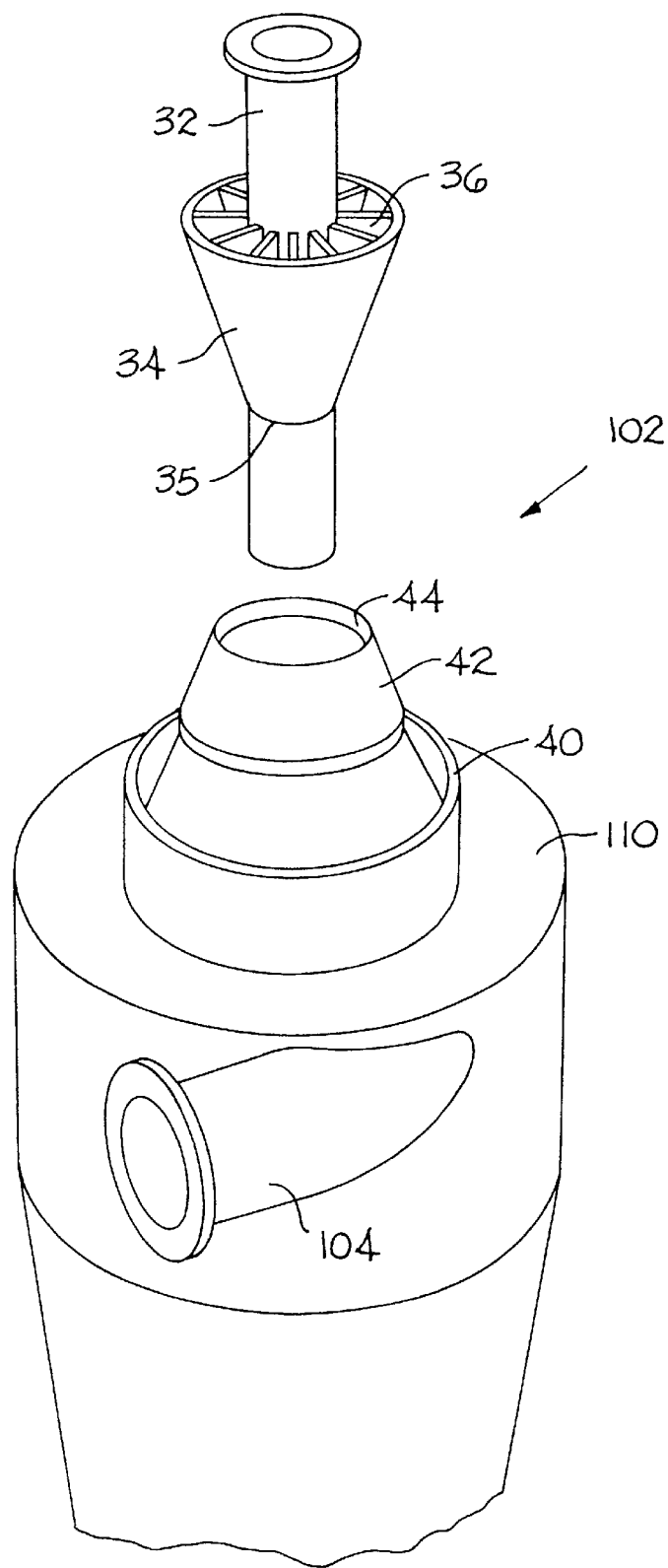

FIGS. 4 and 5 illustrate a preferred embodiment of the present invention. In this embodiment, the cyclone 102 includes a vessel body 110, an inlet 104, and an outlet pipe 32. The outlet pipe 32 has a frustro-conical, tapered outer surface portion formed by an inverted skirt (or funnel) 34 fixedly secured, as by welding along the line 35, to the outside surface of the outlet pipe 32, such that the angle a between the vertical axis of the outlet pipe 32 and the funnel 34 is a small angle a, preferably in the range of 7° to 23°, with the most preferred angle a being 15°. The taper is such that the outer surface portion 34 extends from a narrower outside diameter at the bottom to a wider outside diameter at the top. Gussets 36 preferably are welded to the outlet pipe 32 and to the skirt or funnel 34 and serve to reinforce the skirt 34. Holes 38 are formed in the gussets 36 and provide a place to hook into the outlet pipe 32 to lift it for installation into and removal from the cyclone 102. While the tapered outer surface portion of the outlet pipe 32 is provided by adding the skirt or funnel 34, this tapered outer surface portion could also be achieved by tapering all or part of the outlet pipe 32 itself.

Looking now at the cyclone vessel 110, a collar 42 has a second end fixedly secured, as by welding, to the vessel body 110 at an angle β from the vertical that is larger than the angle a between the tapered outer surface portion of the outlet pipe 32 and the vertical. This angle β is preferably in the 15° to 45° range, with the most preferred angle β being 30°. The first end 44 of the collar 42 is beveled at an angle, so that the beveled edge tapers downwardly from its largest diameter to its smallest diameter. When the collar 42 is installed on the vessel 110, the angle of the beveled edge 44 is the same as the angle of the tapered outer surface 34 of the outlet pipe 32, such that, when the outlet pipe 32 comes to rest against this beveled first end or upper edge 44 of the collar 42, the outer surface 34 of the outlet pipe 32 mates with the first end or upper edge 44 of the collar 42 to form a good metal-to-metal seal. While the collar 42 in this embodiment is welded to the vessel body 110, it could alternatively be formed as an integral part of the vessel body 110. The upper edge 44 of the collar 42 forms the upper opening in the vessel 110, which is sealed by the outlet pipe 32, so that gases must exit the vessel 110 through the outlet pipe 32. While experimentation has shown that the metal-to-metal seal between the tapered outer surface 34 of the outlet pipe 32 and the upper edge 44 of the collar 42 is sufficient, a gasket may be placed between those two surfaces if deemed necessary or desirable.

The first end 44 of the collar 42 is thicker than the second end 46. The greater thickness of the first end 44 allows for more contact surface area with the tapered outer surface 34 of the outlet pipe 32, in order to obtain a better seal. The smaller thickness of the second end 46 of the collar 42 allows for more flexibility between the collar 42 and the vessel 110 to accommodate expansion. In this preferred embodiment, the thickness of the first end is approximately twice the thickness of the second end and is formed by welding a second layer of metal onto the first layer for part of the length of the collar 42.

A layer of insulation 30, such as Vibecast refractory, lines the inner walls of the vessel body 110 of the cyclone 102. A gap between the refractory material 30 and the collar 42 at each side of the collar 42 (only shown on one side in FIG. 4) is packed with ceramic wool 31, such as Kaowool. This prevents any deflection of the support collar 42 from interfering with the rigid refractory material 30.

Referring now to FIG. 5, the outlet pipe 32, having a tapered outer surface portion 34, is inserted into the opening defined by the beveled first end 44 of the collar 42. The tapered surface 34 will enter this opening until its outer diameter exceeds the smallest inside diameter of the opening defined by the beveled first end 44 of the collar 42. Then the funnel 34 will come to rest on the beveled first end 44 of the collar 42, and the two surfaces, having the same taper, mate so as to have a good metal to metal seal. The outlet pipe 32 is then centered and vertically hung with respect to the collar 42.

As a hot fluid stream is introduced into the cyclone 102, the temperature of all the components will begin to rise. Since the vessel body 110 and the collar 42 are insulated with refractory 30 and packed wool 31, their temperature rise will be less dramatic than that of the outlet pipe 32 and its corresponding tapered outer surface 34, resulting in different dimensional growth due to differing thermal expansion. However, the tapered surface 34 is free to grow dimensionally, independent of the vessel body 110 of the cyclone 102. As the tapered surface 34 grows, it rides up the beveled surface 44 of the collar 42, taking up the differential in expansion while keeping the outlet pipe 32 round and vertically hung. Thus, there is no distortion or extra stress caused to the parts by thermal expansion, while still maintaining the desired seal between the parts. To remove the outlet pipe 32, a crane or other lift device simply hooks into the holes 38 in the gussets 36 and lifts the outlet pipe 32 out of the cyclone body 110.

It will be obvious to those skilled in the art that modifications may be made to the embodiment described above without departing from the scope of the present invention.

What is claimed is:

1. A cyclone, comprising:
   a metal cyclone vessel body defining an upper opening having a tapered upper edge having a maximum diameter and a minimum diameter;
   an outlet pipe having a continuous metal outer surface portion, said outer surface portion having a maximum diameter which is larger than the minimum diameter of said tapered upper edge, wherein said outlet pipe is partially inserted into said upper opening and is supported by said upper edge.

2. A cyclone as recited in claim 1, wherein the outer surface portion of said outlet pipe is tapered.

3. A cyclone as recited in claim 2, wherein said outer surface portion is tapered at substantially the same angle as said tapered upper edge.

4. A cyclone, comprising:
   a metal cyclone vessel body having an upper opening;
   a metal collar with first and second ends, said second end secured to said metal vessel body and defining said upper opening;
   an outlet pipe having a continuous metal tapered outer surface portion, said tapered outer surface portion having a maximum diameter which is larger than the diameter of said first end of said collar, wherein said outlet pipe is partially inserted into and supported by said first end of said metal collar.

5. A cyclone as recited in claim 4 wherein the angle of taper of said tapered outer surface portion is between 7° and 23°.

6. A cyclone as recited in claim 5 wherein said angle is approximately 15°.

7. A cyclone as recited in claim 4, wherein said collar extends at an angle in the range of 15° to 45° from the vertical.

8. A cyclone as recited in claim 7, wherein said angle measure approximately 30E from the vertical.

9. A cyclone, comprising:
   a cyclone vessel body having an upper opening;
   a collar with first and second ends, said second end secured to said vessel body and defining said upper opening;

an outlet pipe having a tapered outer surface portion, said tapered outer surface portion having a maximum diameter which is larger than the diameter of said first end of said collar, wherein said outlet pipe is partially inserted into and supported by said first end of said collar, wherein the diameter of said first end of said collar is smaller than the diameter of said second end of said collar.

10. A cyclone, comprising:

a cyclone vessel body having an upper opening;

a collar with first and second ends, said second end secured to said vessel body and defining said upper opening;

an outlet pipe having a tapered outer surface portion, said tapered outer surface portion having a maximum diameter which is larger than the diameter of said first end of said collar, wherein said outlet pipe is partially inserted into and supported by said first end of said collar, wherein said first end of said collar has a beveled edge extending at substantially the same angle as said tapered outer surface portion.

11. A cyclone, comprising:

a cyclone vessel body having an upper opening;

a collar with first and second ends, said second end secured to said vessel body and defining said upper opening;

an outlet pipe having a tapered outer surface portion, said tapered outer surface portion having a maximum diameter which is larger than the diameter of said first end of said collar, wherein said outlet pipe is partially inserted into and supported by said first end of said collar, and wherein said collar is thicker at said first end than at said second end.

12. A cyclone as recited in claim 11, wherein said collar is approximately twice as thick at said first end than at said second end.

13. A cyclone, comprising:

a metal vessel defining an inlet opening, a bottom outlet, and a top outlet; and an outlet tube extending through and sealed against said top outlet, wherein said top outlet has a tapered top surface at an angle to the vertical, and said outlet tube has a correspondingly-tapered continuous metal outer surface supported by said tapered top surface of said metal vessel.

14. A cyclone as recited in claim 13, wherein the angle of taper of said tapered top surface and said tapered outer surface is in the range of seven to twentythree degrees.

15. A cyclone as recited in claim 13, wherein the outlet tube is secured to said vessel body solely by its weight being supported by the tapered top surface of the vessel body.

16. A cyclone, comprising:

a vessel defining an inlet opening, a bottom outlet, and a top outlet; and an outlet tube extending through and sealed against said top outlet, wherein said top outlet has a tapered top surface at an angle to the vertical, and said outlet tube has a correspondingly-tapered outer surface supported by said tapered top surface of said vessel, and wherein said tapered outer surface of said outlet tube is formed by attaching a skirt to said outlet tube.

17. A cyclone as recited in claim 16, and further comprising a plurality of gussets secured to said outlet pipe and to said skirt.

18. A cyclone as recited in claim 17, wherein at least two of said gussets define a hole for lifting and lowering said outlet tube.

* * * * *

UNITED STATES PATENT AND TRADEMARK OFFICE
CERTIFICATE OF CORRECTION

PATENT NO. : 6,361,576 B1  Page 1 of 1
DATED : March 26, 2002
INVENTOR(S) : Anthony Vincent Andriola It is certified that error appears in the above-identified patent and that said Letters Patent is hereby corrected as shown below:

Column 3,
Line 3, delete "a" and insert therefor -- $\alpha$ --.
Line 5, following the word angle, delete "a" and insert therefor -- $\alpha$ --.
Line 6, following the word angle, delete "a" and insert therefor -- $\alpha$ --.
Line 21, delete "a" and insert therefor -- $\alpha$ --.

Signed and Sealed this

Seventeenth Day of September, 2002

Attest:

JAMES E. ROGAN
Attesting Officer    Director of the United States Patent and Trademark Office